US010802256B2

(12) United States Patent
Anhut et al.

(10) Patent No.: US 10,802,256 B2
(45) Date of Patent: Oct. 13, 2020

(54) MULTIFOCAL SCANNING FLUORESCENCE MICROSCOPE

(71) Applicants: Carl Zeiss Microscopy GmbH, Jena (DE); Carl Zeiss AG, Oberkochen (DE)

(72) Inventors: Tiemo Anhut, Jena (DE); Daniel Schwedt, Weimar (DE); Matthias Wald, Jena (DE)

(73) Assignees: Carl Zeiss Microscopy GmbH, Jena (DE); Carl Zeiss AG, Oberkochen (DE)

(*) Notice: Subject to any disclaimer, the term of this patent is extended or adjusted under 35 U.S.C. 154(b) by 318 days.

(21) Appl. No.: 15/117,849

(22) PCT Filed: Feb. 9, 2015

(86) PCT No.: PCT/EP2015/052605
§ 371 (c)(1),
(2) Date: Aug. 10, 2016

(87) PCT Pub. No.: WO2015/121188
PCT Pub. Date: Aug. 20, 2015

(65) Prior Publication Data
US 2016/0377850 A1    Dec. 29, 2016

(30) Foreign Application Priority Data
Feb. 12, 2014   (DE) .................. 10 2014 002 328

(51) Int. Cl.
G02B 21/00    (2006.01)
G02B 21/36    (2006.01)
(Continued)

(52) U.S. Cl.
CPC ....... G02B 21/0076 (2013.01); G02B 21/004 (2013.01); G02B 21/0032 (2013.01);
(Continued)

(58) Field of Classification Search
CPC ............ G02B 21/0076; G02B 21/0032; G02B 21/004; G02B 21/0064; G02B 21/33;
(Continued)

(56) References Cited

U.S. PATENT DOCUMENTS 5,239,178 A    8/1993 Derndinger et al.
5,748,371 A *  5/1998 Cathey, Jr. ............ G01S 3/7835
                                              356/3
(Continued)

FOREIGN PATENT DOCUMENTS

DE    197 02 753 A1    7/1998
DE    103 56 416 A1    6/2005
(Continued)

OTHER PUBLICATIONS

PCT Notification of Transmittal of Translation of the Intl. Preliminary Report on Patentability, Intl. Preliminary Report on Patentability, Written Opinion of ISA.
(Continued)

Primary Examiner — Thomas K Pham
Assistant Examiner — Mitchell T Oestreich
(74) Attorney, Agent, or Firm — Duane Morris LLP

(57) ABSTRACT

Scanning fluorescence microscopes with an observation beam path from a measurement volume to an image plane. A beam combiner is provided for coupling an illumination system and a diaphragm arranged in the image plane for slow composition of the image because of the sequential scanning and subject the sample to loading as a result of inefficient use of the excitation light. The microscope simultaneously detects fluorescence from different focal planes in each case quasi-confocally. The observation beam path between the beam combiner and the image plane has a first diffractive optics for splitting light beams into beam bundles along different orders of diffraction, imparting to the light
(Continued)

beams a spherical phase that is different from the other orders of diffraction. A second diffractive optics is provided for the compensation of chromatic aberrations of the split beam bundles, and a collecting optics is provided for focusing split beam bundles into the image plane.

18 Claims, 3 Drawing Sheets

(51) Int. Cl.
*G02B 27/00* (2006.01)
*G02B 21/33* (2006.01)
*G02B 27/09* (2006.01)
*G02B 27/10* (2006.01)
*G02B 27/42* (2006.01)

(52) U.S. Cl.
CPC ......... *G02B 21/0064* (2013.01); *G02B 21/33* (2013.01); *G02B 21/367* (2013.01); *G02B 27/0037* (2013.01); *G02B 27/0075* (2013.01); *G02B 27/0927* (2013.01); *G02B 27/0988* (2013.01); *G02B 27/1086* (2013.01); *G02B 27/4211* (2013.01); *G02B 27/4227* (2013.01)

(58) Field of Classification Search
CPC .............. G02B 21/367; G02B 27/0037; G02B 27/0075; G02B 27/0927; G02B 27/0988; G02B 27/1086; G02B 27/4211; G02B 27/4227
USPC ........................................................ 359/385
See application file for complete search history.

(56) References Cited

U.S. PATENT DOCUMENTS

| | | |
|---|---|---|
| 6,028,306 A | 2/2000 | Hayashi |
| 7,295,726 B1 | 11/2007 | Milanovic et al. |
| 2011/0226962 A1 | 9/2011 | Boudreau et al. |
| 2013/0010098 A1 | 1/2013 | Kalkbrenner et al. |
| 2013/0162982 A1 | 6/2013 | Miyazono |
| 2013/0176622 A1 | 7/2013 | Abrahamsson et al. |

FOREIGN PATENT DOCUMENTS

| | | |
|---|---|---|
| JP | H04171415 A | 6/1992 |
| JP | 2013515249 A | 5/2013 |
| JP | 2013130522 A | 7/2013 |

OTHER PUBLICATIONS

Dalgarno, Paul A., et al.; "Multiplane imaging and three dimensional nanoscale particle tracking in biological microscopy"; Optics Express 2010; 18(2):877-884.

Blanchard, Paul M., et al.; "Simultaneous multiplane imaging with a distorted diffraction grating"; Applied Optics 1999; 38(32): 6692-6699.

Tucker, Sara C., et al.; "Extended depth of field and aberration control for inexpensive digital microscope systems"; Optics Express 1999; 4(11):467-474.

Abrahamsson, Sara, et al.; "Fast and sensitive multicolor 3D imaging using aberration-corrected multi-focus microscopy"; Nature Methods 2013; 10(1):60-63.

Seitz, Peter, et al.; "Single-Photon Imaging"; Springer Series in Optical Sciences 160; pp. 1-25.

Dowski, Edward R. and Cathey, W. Thomas; "Extended depth of field through wave-front coding"; Applied Optics 1995; 34(11):1859-1866.

Lin, Y., et al.; "Experimental investigation of Bessel beam characteristics"; Applied Optics 1992; 31(15):2708-2713.

Sheppard, C. J. R.; "Super-resolution in Confocal Imaging"; Optik 1988; 80(2):53-54.

Chen, Nanguang, et al.; "Focal Modulation Microscopy"; Optics Express 2008; 16(23): 18764-18769.

English Translation of Japanese Office Action for JP 2016-568122.

* cited by examiner

MULTIFOCAL SCANNING FLUORESCENCE MICROSCOPE

RELATED APPLICATIONS

The present application is a U.S. National Stage application of International PCT Application No. PCT/EP2015/052605 filed on Feb. 9, 2015 which claims priority benefit of German Application No. DE 10 2014 002 328.1 filed on Feb. 12, 2014, the contents of each are incorporated by reference in their entirety.

FIELD OF THE INVENTION

The invention relates to a scanning fluorescence microscope with an optical system, which defines a microscopic observation beam path from a measurement volume to an image plane and comprises (enumerated in the direction from the measurement volume to the image plane) a microscope objective, a beam combiner with an input for coupling an illumination system and a diaphragm arranged in the image plane. The diaphragm is referred to hereinafter as a confocal diaphragm. The microscope may expediently also comprise an illumination system with a light source, preferably at least one laser.

BACKGROUND OF THE INVENTION

Confocal scanning fluorescence microscopes, for example according to DE 197 02 753 A1, have become an indispensable tool in the discipline known as life sciences. The image is generally composed by a single diffraction-limited focal volume (the measurement volume), defined by a three-dimensional point spread function (PSF), sequentially scanning the sample. Out-of-focal fluorescent light is separated from the focal fluorescent light, the used signal, at the confocal diaphragm. This leads to imaging with the property of an optical section, so that only fluorescent light from the focal plane contributes to the measurement signal. As a result, imaging known as blur-free is possible, even of optically thicker and readily scattering samples. The thickness of the optical section depends here on the size of the confocal diaphragm aperture and is downwardly limited only by the diffraction-related resolving power.

However, scanning, sequential image composition also has disadvantages. For instance, the composition of the image is relatively slow, in order to be able to achieve a sufficient signal-to-noise ratio (SNR) by accumulating sufficient fluorescence photons per pixel. A further problem is the bleaching of the sample. Excitation light is always also deposited in the cone of light tapering toward the focal volume. The out-of-focal fluorescence emission excited thereby is not however used for the confocal imaging, but is specifically discriminated at the confocal detection diaphragm for the purpose of the optical section. Therefore, only the sample is subjected to the loading of the out-of-focal light input. In this case, because of the nonlinearity of the bleaching process, the sample bleaches especially in the vicinity of the focal plane. In order to shorten the pixel dwell time, and consequently the recording of the image overall, it is usual to increase the excitation intensity. However, this leads to increased loading of the sample, and as a consequence to strong bleaching and photographic damage.

One possibility of reducing the sample loading is to parallelize the image recording. This is accomplished for example as in U.S. Pat. No. 5,239,178 or 6,028,306 with N separate, simultaneously illuminated and measured measurement volumes (referred to simply as measurement points) in the focal plane. This allows the sample to be measured at the same time at N points with less intensity per illuminating beam. The illumination intensity is in this case lowered by a factor of 1/N and the pixel dwell time is extended by the factor N, so that the image refresh rate (frame rate) is identical and the SNR is comparable to scanned recording by means of an individual measurement volume. Although the amount of energy input into the sample is the same, it is however spatially distributed, so that the risk of sample-damaging saturation of the fluorescence can be reduced. Multiply parallel image recording with the same advantages is also accomplished by means of a rotating Nipkow disk or with linear scanning.

On the other hand, by parallel imaging of a number of measurement points, the necessary image recording time can be reduced, so that for example in the case of repeated recording the maximum possible frame rate is higher. However, as described above, this requires an increased excitation intensity.

As an alternative to the simultaneous imaging of a number of measurement points from the same focal plane, it is possible also for measurement points from planes that are parallel to the focal plane (also referred to hereinafter as the primary focal plane) and are at different distances from the microscope objective (hereinafter referred to as secondary focal planes) to be simultaneously imaged and detected in each case quasi-confocally.

In the prior art, such axial-multifocal imaging is known from DE 103 56 416 A1 for the special case of monochromatic confocal microscopy. Used there is a multifocal imaging system in the form of an optically decentered diffractive-optical element (DOE), for example a phase grating, with a collecting optics for the simultaneous imaging of a number of separate measurement volumes lying on the optical axis of the microscope objective. Wavefronts from sample planes at different distances from the objective (primary and secondary focal planes) have different curvatures at the DOE. They are distributed by the DOE among different orders of diffraction and are advantageously focused into the same plane (in which the confocal diaphragm is arranged). In this case, wavelengths other than the illumination wavelength are discriminated at the diaphragm. As a result, this microscope is only suitable for monochromatic imaging. In fluorescence measurements, on the other hand, a great spectral bandwidth has to be detected on account of the Stokes shift and the spectral distribution of fluorescence emission. The microscope according to DE 103 56 416 A1 therefore cannot be used for fluorescence measurement, and particularly cannot be used for spectral imaging, but only for reflection measurements, for example in material microscopy.

SUMMARY OF THE INVENTION

The invention is based on the object of improving a scanning fluorescence microscope of the type mentioned at the beginning in such a way that fluorescence from different focal planes (the primary and secondary planes) can be simultaneously detected in each case quasi-confocally.

The object is achieved by a scanning fluorescence microscope that has the features specified in claim 1.

Advantageous configurations of the invention are specified in the dependent claims.

According to the invention, the optical system comprises in the observation beam path between the beam combiner and the image plane a first diffractive optics for splitting light beams into (refocused) beam bundles along different orders of diffraction, imparting to the light beams of each order of diffraction a spherical phase that is different from the other orders of diffraction, in particular a respective integral multiple of a (predetermined) spherical phase, a second diffractive optics for the compensation of chromatic aberrations (produced by the first diffractive optics) of the split beam bundles and a collecting optics for the focusing of the split beam bundles into the image plane, so that a series of different measurement volumes arranged on the optical axis of the microscope objective (on the object side) or measurement volumes arranged on an axis parallel thereto (disjunctive) can be imaged simultaneously into the image plane (along the different orders of diffraction of the diffractive optics). "On the object side" is in this case synonymous with "on a side of the microscope objective that is facing away from the image plane".

The first diffractive optics preferably refocuses wavefronts of light beams from different focal planes in such a way that they have a respective planar wavefront, the respective direction of propagation (wave vector) of each refocused wavefront corresponding to one of the orders of diffraction. The diffractive optics may for example be a DOE. The first diffractive optics is preferably a two-dimensional phase grating. The second diffractive optics is expediently arranged between the first diffractive optics and the collecting optics. It may for example be formed as a grating. The second diffractive optics allows all wavelengths to be passed through the aperture(s) of the confocal diaphragm. It goes without saying that, before the light is detected, one or more intermediate image planes may be produced by transfer optics before and/or after the confocal diaphragm. A second diffractive optics for the correction of chromatic aberrations of refocused split beam bundles is described for example in "Fast multicolor 3D imaging using aberration-corrected multifocus microscopy" (Abrahamsson et al. in "Nature Methods", volume 10, No. 1, page 60) under the designation "CCG".

The distance-dependent, color-independent splitting of the light from the different (primary and secondary) focal planes also allows out-of-focal fluorescence to be imaged and simultaneously detected quasi-confocally. This reduces the sample loading, in that the input excitation light is better utilized. In particular, even for a number of measurement points, only a single illumination volume, and consequently also only a single upstream cone, need be excited.

Preferably, an optics for extending (lengthening) an (object-side) depth of focus (extent of focus) of the microscope objective is additionally arranged along the optical axis of the objective outside the observation beam path ahead of the beam combiner input for the coupling of the illumination system. The position outside (the optical system) of the observation beam path means that only the extent of the illumination volume, but not the extent of the measurement volumes that lie at various locations of the illumination volume is influenced. The optics for extending the depth of focus has the effect of reducing the axial resolving power; the maximum resolution in the direction of illumination is therefore artificially worsened. On account of the depth of focus extended in this way (extended depth of field, EDOF) of the illumination volume, more measurement volumes can be excited simultaneously with identical light power. Moreover, the focal planes, and consequently the measurement volumes, can be spaced axially further apart from one another, so that they can be optically separated better from one another.

In DE 103 56 416 A1, an arrangement of two crossed phase gratings one behind the other is provided, in order to be able to image a greater number of axial measurement volumes simultaneously. This type of two-dimensional splitting of the orders of diffraction, and consequently also the imagings of the measurement volumes, has the disadvantage however of being light-arresting. It is consequently unsuitable for fluorescence microscopy.

Therefore, embodiments in which the (two-dimensional) phase grating splits wavefronts coming from the microscope objective into $(2m+1)^2$ orders of diffraction with m= 1, 2, 3, . . . over two different spatial directions are particularly advantageous. In this way, the split beam bundles are arranged in the detector plane as a square $(2m+1)\times(2m+1)$ matrix and a great number of planes can be simultaneously recorded (optoelectronically converted) with little effort by means of a two-dimensional detector matrix. The two-dimensional splitting by an individual diffractive optics is of high light-gathering power and thus makes a multiple-axial-multifocal, sample-sparing recording of fluorescent light possible.

For a first advantageous configurational variant, it is provided that the (confocal) diaphragm has (precisely) one aperture and the collecting optics focuses each of the split beam bundles of the various orders of diffraction onto this (common) aperture. The detectors may for example be arranged at a distance behind the diaphragm in such a way that the (optical axes of the) beam bundles are made to diverge at least by a distance corresponding to the distance between the detectors by the time they arrive at the detectors. Alternatively, they may be arranged in a further image plane.

For a second advantageous configurational variant, it is provided that the (confocal) diaphragm has for each of the split orders of diffraction, or at least for a subset of the split orders of diffraction, a respective aperture and the collecting optics focuses each of the split beam bundles of the various orders of diffraction onto the relevant aperture. The detectors may for example be arranged (directly) behind the apertures of the confocal diaphragm or in a further image plane.

Preferably, at least one detector for each of the orders of diffraction is respectively arranged behind the confocal diaphragm. The detectors are preferably readable with high repetition frequencies of at least 100 kHz and are preferably suitable for single photon detection. For example, all of the detectors taken together may be a matrix of single-photon avalanche diodes, SPAD, which are for example operated in Geiger mode, as described in "Single-Photon Imaging" by Seitz in "Springer Series in Optical Sciences", volume 160. Each individual diode or a respective, correspondingly assigned subgroup of single diodes is then a detector in terms of the invention (readable independently of the others). The number of detectors is then for example greater than the number of beam bundles. Instead of SPAD, the detectors may be a two-dimensional matrix configured in the form of a multi-anode photomultiplier, the number of detectors corresponding to the number $(2m+1)^2$ of beam bundles. Alternatively, a separate matrix of detectors, for example in each case an SPAD matrix, may be arranged behind each aperture of the confocal diaphragm.

It may be advantageous if the optical system comprises at least one optics for producing a further image plane. The detectors may then be arranged in this further image plane.

The invention has the particular advantage that each beam bundle, at least of the orders of diffraction other than zero, optionally also the zeroth order of diffraction, can be additionally split by the optical system spatially-spectrally in itself before it arrives at the detectors. For this purpose, at least one spectrally dispersive element may advantageously be arranged in the optical system between the image plane and the further image plane in such a way that, for the split beam bundles at least of the orders of diffraction other than zero, different wavelengths are focused onto different locations of the further image plane. In this case, the at least one dispersive element may be arranged in a collimated beam path portion of the transfer optics.

Such a spatial-spectral splitting of a beam bundle among a number of detectors allows the measurement volume from which the relevant bundle originates to be detected in a spectrally resolved manner. This provides additional information on the measurement volume. Preferably, a group of a number of detectors is arranged in each case in the observation beam path after the dispersive element for each order of diffraction. The groups are expediently disjunctive. Each detector group is in this case biuniquely assigned to a respective measurement volume. Each detector of a detector group in this case corresponds to a spectral channel of the relevant measurement volume. In particular, a number of different fluorescent dyes can thus be simultaneously detected and identified, for example by means of unmixing or principal component analysis (PCA). As a result, fluorescent markers of various types can be simultaneously localized.

One or more prisms (for example one per split beam bundle/order of diffraction, optionally also in the zeroth order of diffraction) or one or more diffraction gratings (for example one per split beam bundle/order of diffraction, optionally also in the zeroth order of diffraction) may be used for example as a spectrally dispersive element.

Preferably, the spectrally dispersive element is arranged in a plane conjugate to the pupil plane of the microscope objective. Since a point of intersection of the focused split, chromatically corrected light beam bundles lies in the pupil plane, all of the light beam bundles can be spatially-spectrally split with a single dispersive element of a small size.

Expediently, in all embodiments at least one spectrally dispersive element, but preferably all the spectrally dispersive elements, may be movably mounted for reversible removal from the observation beam path, for example for calibrating purposes.

Embodiments in which the optics for producing an extended depth of focus comprises a phase plate, in particular a cubic phase modulation mask or means for producing Bessel beams, in particular respectively arranged in a plane conjugate to the pupil plane of the microscope objective, and/or is designed for underfilling the pupil of the microscope objective, in particular by beam shaping, in particular to reduce a beam cross section of collimated light, are advantageous. Cubic phase modulation masks for producing an extended depth of focus are described for example in "Extended depth of field through wave-front coding" (Dowski/Cathey in "Applied Optics", volume 34, No. 11, page 1859). An optics for underfilling the pupil may be for example a beam shaper that reduces the beam cross section in the pupil. The underfilling of the pupil leads to the reduction of the numerical aperture of the illumination, resulting in a worsened axial resolving power $\omega_z$.

Any other known EDOF-like optics may also be used for producing an axially extended illumination volume, for example by introducing phase or diaphragm masks into a pupil of the illumination beam path in order to produce Bessel beams, as in "Experimental investigation of Bessel beam characteristics" (Y. Lin in "Applied Optics", volume 31, page 2708) or to impart a cubic phase profile to the illumination light in a way corresponding to "Extended depth of field through wave-front coding" (Dowski/Cathey in "Applied Optics", volume 34, No. 11, page 1859). A light source or an optics downstream of the light source that axially defines a series of points corresponding to the measurement volumes, described for example in DE 103 56 416 A1 with the reference sign 11, may also be advantageous. The advantage lies in the better resolution in each axial focal plane, because full confocality can be respectively achieved here. The disadvantage is a more extended illumination of the sample, with correspondingly greater loading.

Preferably, the optics for extending the depth of focus produces an illumination volume of which the axial extent is at least five times, particularly at least ten times, more particularly at least twenty times, its lateral extent and/or, for a predetermined excitation wavelength, a predetermined numerical aperture of the microscope objective, a predetermined confocal diaphragm aperture size and a predetermined refractive index of an immersion medium, corresponds to at least two optical section thicknesses of the microscope. This allows the (first) diffractive optics to be formed to provide a sufficient axial distance for the optical separation in comparison with the prior art.

The (first) diffractive optical element is advantageously formed such that midpoints of adjacent axial measurement volumes for a predetermined excitation wavelength, a predetermined numerical aperture of the microscope objective, a predetermined confocal diaphragm aperture size and a predetermined refractive index of an immersion medium are more than two optical section thicknesses of the microscope from one another. However, appropriate configuration of the (first) diffractive element for a given objective allows a desired axial separation of measurement volumes to be achieved by setting the axial splitting by means of the grating parameters.

It is advantageous if the optics for extending the depth of focus is formed such that all of the measurement volumes imaged into the image plane lie within the extended depth of focus, if therefore the illumination with the extended depth of focus in the sample is adapted to the regions that are covered by the detection. In this way, the excitation light can be used efficiently, whereby the sample is spared. For this purpose, either with a given grating in the detection the illumination optics can be adapted such that the measurement volumes are completely illuminated, or with a given light distribution in the sample the detection beam path can be adapted such that the illuminated regions are completely imaged (and detected).

The beam combiner may expediently be a color splitter, in order to split off scattered excitation light from the sample light. As a result, to a great extent only fluorescent light reaches the detectors. If during spectral detection the spectral resolution is sufficiently high, it is possible to dispense with a color splitter. The spectral channels corresponding to the excitation wavelength are then discriminated.

Preferably, the first diffractive optics is arranged in or at least approximately in a plane conjugate to a pupil of the microscope objective. For this purpose, the optical system may comprise one or more transfer optics, which in each case provide an (additional) conjugate pupil plane.

The scanning fluorescence microscope may expediently have an illumination system with a light source for the emission of excitation light. The light source is then expediently arranged for injecting the excitation light into the observation beam path by way of the input of the beam combiner (in the direction of the microscope objective), particularly with a collimation optics between the light source and the beam combiner. It may for example be a laser. In this case, the excitation light emitted by the light source may be subjected to advantageous axial focus lengthening on the object side. Preferably, a linear illumination focus (overlapping with the measurement volumes) is obtained (by the imaging of the optics for extending the focus and of the objective, in particular also of further beam-shaping optics in the illumination beam path), a longitudinal direction of the line being parallel to the optical axis of the microscope objective. Thus, the sample is spared. This is accomplished for example with a light source virtually in the form of a point, such as for example a laser. For more effective use of the excitation light, and consequently for sparing the sample, the illumination line may be constricted at certain points, so that substantially only the measurement volumes in the primary and secondary detection focal planes are illuminated (but not intermediate spaces between the measurement volumes).

Advantageously, the optical system that defines the microscopic observation beam path may have optically between the microscope objective and the beam combiner an adjustable beam deflecting unit (beam scanning unit) for sequentially scanning different measurement volumes and a transfer optics for imaging the deflecting unit into the pupil of the microscope objective. The scanning is thus made possible with little effort. The deflecting unit may comprise not only quasi-static and resonant scanners but also galvo scanners and MEMS scanners. Optically advantageous is a scanner with a defined rotation point, for example an MEMS-based scanner as described in U.S. Pat. No. 7,295,726 B1.

Preferably, the detectors are arranged as a two-dimensional matrix and the microscope comprises a control unit, which is designed to adjust the beam deflecting unit, to record light by means of the detectors and to detect signal values output by the detectors, to repeat the aforementioned steps a number of times and to obtain from the detected signal values a stack of confocal images.

The invention may be advantageously combined with a manipulation of the sample. For example, a reaction of the sample is induced by wide-field illumination or by a specific focused illumination. Applications here are for example FRAP or the release (uncaging) of substances. The invention may also be combined with optogenetic methods.

The detectors may advantageously be arranged for the spatial oversampling of the point spread function in at least one of the orders of diffraction, preferably in each order of diffraction, for example as described in "Super-resolution in confocal imaging" by Sheppard in "Optik", volume 80 (1988), page 53. In this way, the form of the PSF and the intensity distribution within the PSF can be ascertained. In this way, an image of a higher resolution can then be obtained. The oversampling is accomplished for example by a respective group of (disjunctive) detectors for each order of diffraction being arranged in the observation beam path. If the optical system is designed for spectrally resolved detection, a number of detectors of the relevant group may be respectively arranged in the same wavelength range. Suitable detectors here are for example SPAD matrix sensors, on account of their sensitivity, reading rate and their pixelation.

The imaging according to the invention may also be used in combination with other methods for increasing the optical resolution, such as for example STED or RESOLFT. Ideally, two illumination beam paths are provided for this purpose and coupled by means of an additional beam combiner, so that light from both reaches the sample. As described above, the first produces an extended object-side focus for the fluorescence excitation (excitation beam), preferably by means of a Bessel beam. The second illumination beam path produces, for example by means of an annular diaphragm with an imparted spiral phase, a self-reconstructing annular beam (Bessel beams of higher order with missing central maximum), which then serves for the disexcitation/suppression of the fluorescence outside the center (disexcitation beam). The wavelength of the disexcitation beam is preferably red-shifted with respect to the excitation beam. For this purpose, the first illumination beam path may have a light source that emits a shorter wavelength than the light source of the second illumination beam path.

The optical system may comprise adaptive optics in such a way that all of the illumination and/or detection PSFs are corrected simultaneously. A feedback mode for the adaptive optimization of the signals in the N channels (orders of diffraction) is possible here.

The axial-multifocal imaging may be combined with a scanning in the z direction (taking place along the optical axis).

The fluorescence excitation may take place both linearly (by means of single-photon excitation) and non-linearly (by means of multi-photon excitation or frequency multiplication—"Second Harmonic Generation" (SHG), CARS etc.). However, the detection in this case expediently takes place "descanned". The particular advantage of non-linear excitation is that, as a result of the squaring of the intensity, it is easier to generate an axially extended PSF. Furthermore, the method can also be combined with other methods of fluorescence imaging, for example with "Focal Modulation Microscopy" (Chen et al. in "Optics Express", volume 16, edition 23, page 18764).

The invention may be advantageously used in particular for rapid particle tracking.

The invention is explained in more detail below on the basis of exemplary embodiments.

DESCRIPTION OF THE EMBODIMENTS OF THE INVENTION

In all of the drawings, parts that coincide bear the same reference signs.

Figure 1:
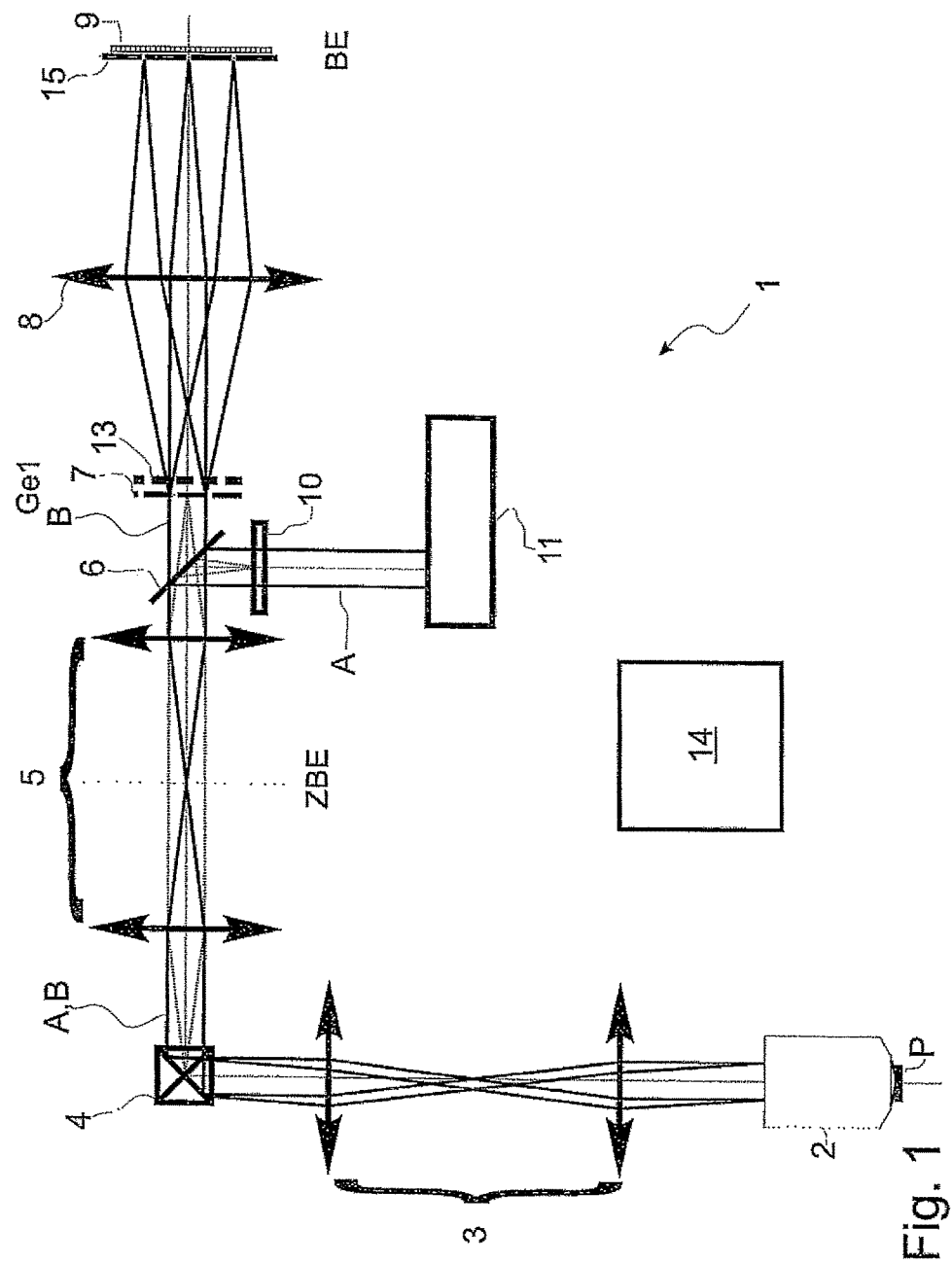
FIG. 1 shows a microscope for axial-multifocal detection.

FIG. 1 schematically shows a scanning fluorescence microscope 1 in the form of a laser scanning microscope (LSM). Here, a laser as a light source 11 as an illumination system together with a microscope objective 2 defines an illumination beam path A, which contains a phase mask 10 and is combined (optically coupled) by a beam splitter 6, for example a dichroic beam splitter cube, with the observation beam path B. The phase mask 10 is arranged outside the observation beam path B. An optical transfer system 5 images the plane of the phase mask 10 onto a deflecting unit 4, which can deflect the excitation light beam in the x and y directions. A further optical transfer system 3 images the deflecting unit 4 into the pupil plane of the objective 2. The objective 2 focuses the laser beam into the sample P, the lateral position of the illumination volume depending on the deflecting angles that are set on the deflecting unit 4.

The axial length of the illumination volume, that can be given for example by the full half-width of the axial intensity profile of its PSF, is established by the nature of the phase mask 10 and is significantly lengthened in the z direction with respect to that of the microscope objective 2 on its own (without the phase mask 10), whereas the lateral size of the illumination PSF in the x and y directions is approximately identical. For this purpose, the phase mask 10 is for example a cubic phase modulation mask. The extent of the illumination volume in the z direction is for example five times that in the x direction or in the y direction.

The fluorescent light produced along the lengthened focal profile in the sample P is substantially collimated by the objective 2 and passes back through the optics described above to the beam splitter 6, which spectrally separates the observation beam path B from the illumination beam path A. The transfer optics 5 thereby transforms the intermediate image plane ZBE, in which there is information distributed in the axial direction, into a first grating plane GE1, which is the pupil plane of the transfer optics 5. Arranged in the first grating plane GE1 is a first diffractive optics 7 in the form of a two-dimensional DOE phase grating, which produces $(2m+1)^2$ orders of diffraction (here for example m=1) and thus splits the incident light into a corresponding number of beam bundles. The phase grating 7 imparts a constant spherical phase term on each order of diffraction (each of the beam bundles), whereby a refocusing of the intermediate image plane ZBE by the respective phase term takes place, advantageously in equidistant steps, in dependence on the wavefront curvature, and consequently in dependence on the distance of the fluorescence emission from the objective 2. Downstream of the first diffractive optics 7 there is a second diffractive optics 13, for example a grating or a DOE, in order to cancel out the spectral dispersion of the phase grating 7 in GE1. The light beam bundles, split into the orders of diffraction, refocused and color-corrected, are imaged by the lens 8 as a collecting optics onto the confocal diaphragm 15 in the image plane BE, behind which a detector matrix 9 is arranged. The detectors $9_{ik}$ (for example i=1 . . . 128; k=1 . . . 128) of the matrix 9 are for example SPAD, but may also be CCD or CMOS sensors.

A control unit 14 controls the deflecting unit 4 and the light source 11 and also the detectors $9_{ik}$. It is also designed for accepting and for example computationally correcting their measured values.

Figure 2:
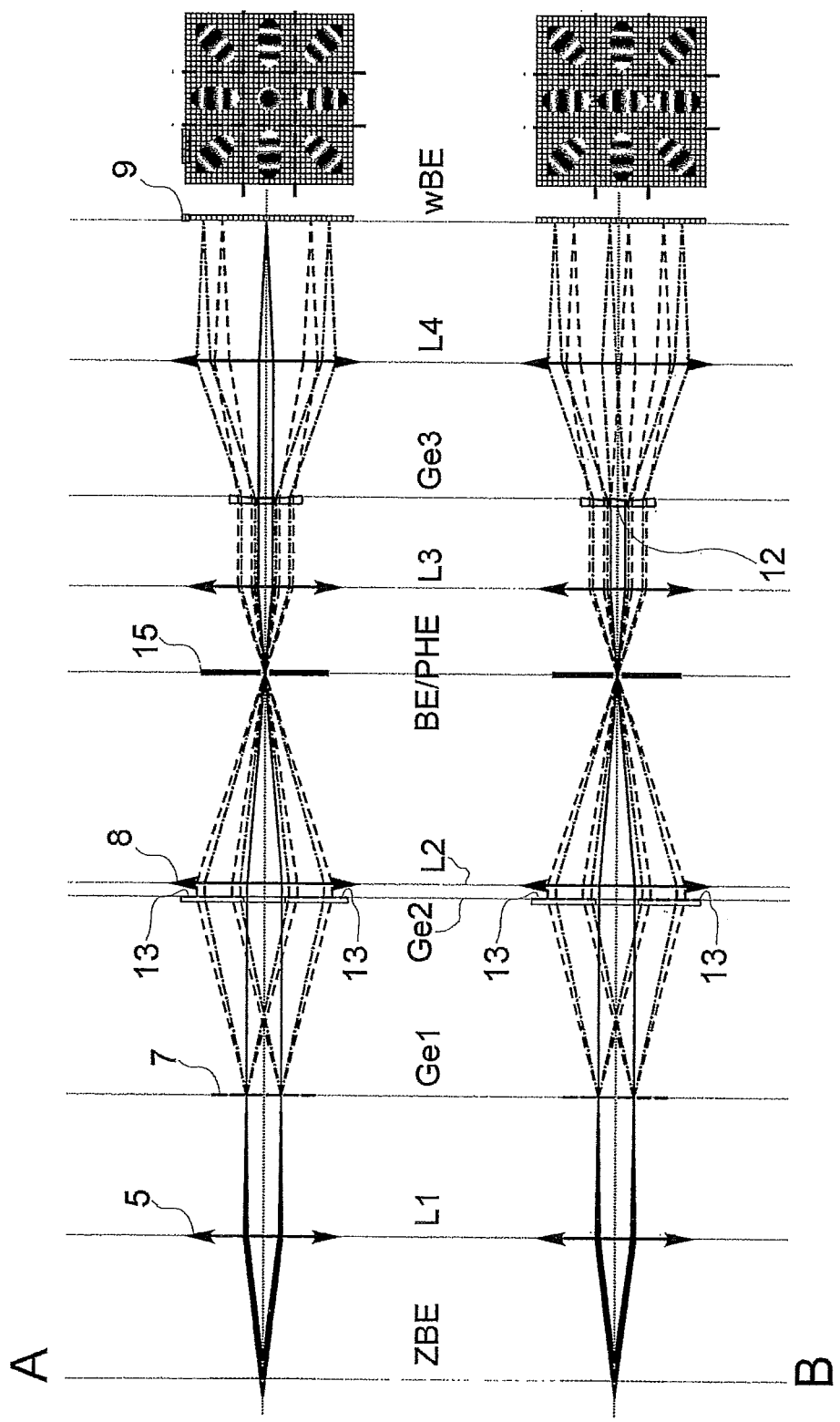
FIG. 2 shows cutouts from a first embodiment and a second embodiment of the optical system for the definition of an observation beam path and
FIG. 3 shows cutouts from a third embodiment and a fourth embodiment of the optical system for the definition of an observation beam path.

In FIG. 2A, a cutout of the observation beam path B is schematically shown in detail. The lens designated by L1 is in this case for example part of the transfer optics 5. After the refocused splitting at the diffractive optics 7 in the first grating plane GE1 conjugate to the pupil plane of the objective 2, the refocused information is color-corrected by the second diffractive optics 13, in order to compensate for the spectral dispersion of the phase grating 7 in GE1, and is imaged by the collecting optics 8 in the plane L2 directly onto the pixelated sensor 9. Each order of diffraction consequently images a respective measurement volume from a different plane of the sample P sharply onto the detector matrix 9. Furthermore, the fluorescent light of each order of diffraction apart from the zeroth order is spectrally dispersed. The resultant light distribution on the detector matrix 9 is schematically indicated in the two Subfigs. 2A, 2B schematically alongside the beam path.

Ideally, all non-relevant orders of diffraction of the second diffractive optics 13 are suppressed to the greatest extent in GE2. The imaging by the collecting optics L2 then has the effect that all of the subbeams of each wavelength and each plane of origin are focused onto one point. In this image plane BE (at the same time pinhole plane PHE), the sample light is then filtered quasi-confocally by means of a pinhole diaphragm 15 and out-of-focal light is separated from the fluorescent light originating from the measurement volume (focal plane) considered in the respective order of diffraction.

The lens in the plane L3, which for example with the lens in the plane L4 forms a further transfer optics, collimates the light beams transmitted through the pinhole diaphragm 15 in the PHE and produces a further pupil plane GE3, in which all of the orders of diffraction again separate from one another. In this plane GE3 there may optionally be inserted a spectrally dispersing and order-separating element 12, in order on the one hand to image the different planes of the ZBE by means of the lens L4 onto different positions of the detector matrix 9 and on the other hand to disperse the spectral information among the detectors $9_{ik}$. The element 12 is for example a segmented prism, which spreads the orders of diffraction in relation to one another, the segment in the zeroth order of diffraction being a plane-parallel plate. As a result, the zeroth order is not spectrally resolved on the detector matrix 9. The eight other orders of diffraction can be detected in a spectrally resolved manner, because each beam bundle is dispersed among a relevant group of detectors $9_{ik}$ (respective subset of all the detectors) on account of the spatial/spectral splitting.

In FIG. 2B, a spectrally dispersing element 12, for example a prism or a diffraction grating, is additionally arranged in the beam path of the zeroth order, so that all the orders of diffraction are split spatially spectrally among a respective group of detectors $9_{ik}$. Thus, the spectral information can also be ascertained for the sample plane that is represented by the zeroth order. The spectrally dispersing element 12 is advantageously arranged such that it can be repositioned in the observation beam path B and can be reversibly removed again.

The data measured by means of the detectors $9_{ik}$ are already quasi-confocal in relation to the primary and secondary focal planes. Only the orientation of the dispersion has to be included in the calculation by means of a calibration. The calibration of the detection system takes place for example by an individual fluorescent bead being moved axially through the illumination focal region of the microscope 1, the element 12 being removed from the beam path of the zeroth order. In this case, the detectors $9_{1k}$ measure under the zeroth order the chromatically undisturbed PSF of the optical system. On the basis of this PSF, the spectral dispersion of every other order of diffraction can be ascertained, since the identical PSF must be present in these other orders, just corrected by the respective (predetermined) phase term. With the then known PSF, the dispersion of the element 12 can finally also be calibrated.

Figure 3:
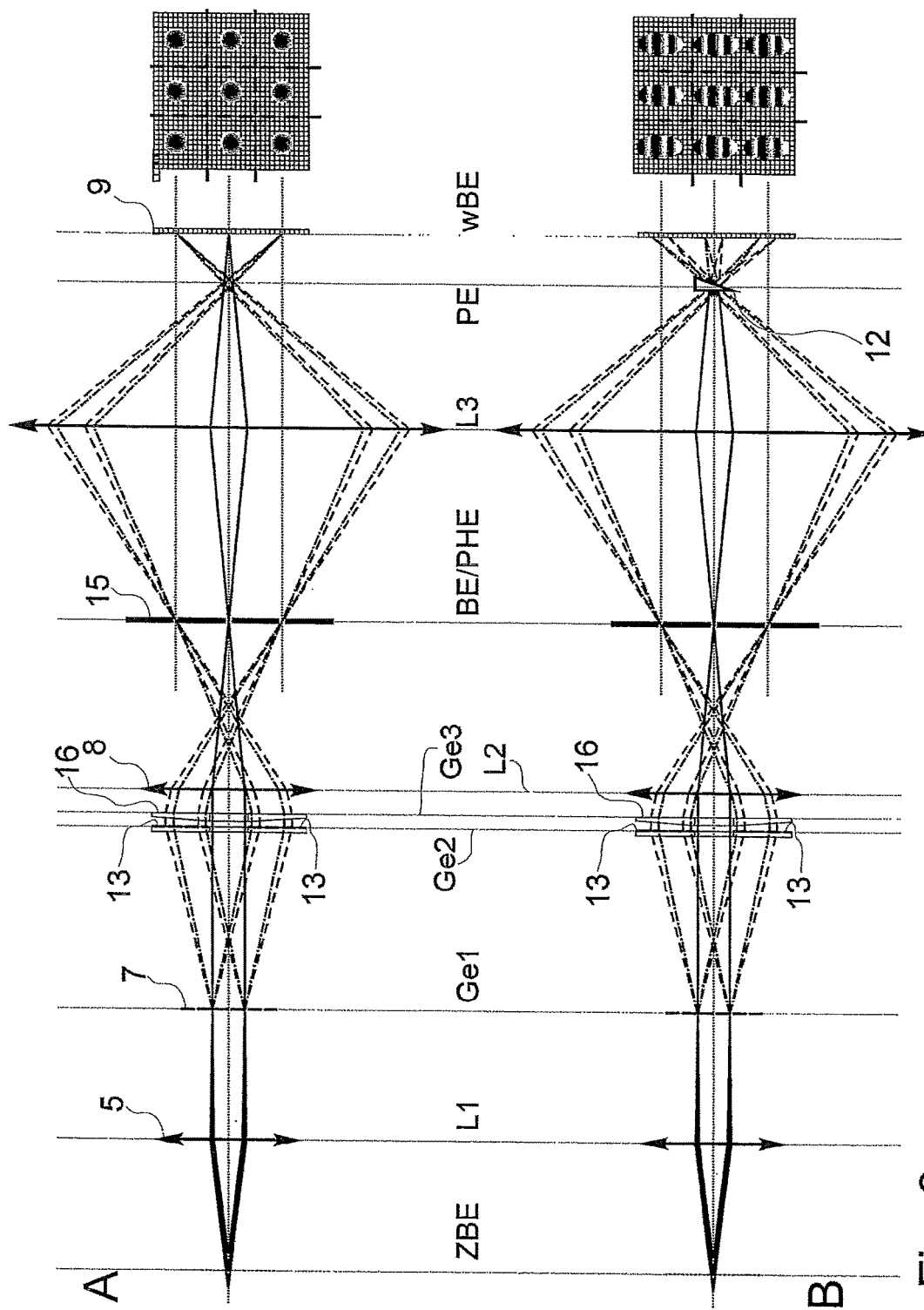

In FIG. 3A, a cutout from a further optical system for the definition of an observation beam path B is represented. As a difference from FIG. 2A, an order-separating element 16, for example segmented by different prisms, has been introduced into the grating plane GE3 between the correction grating in GE2 and the collecting optics L2. The sum of the spectral dispersions of the elements in GE2 and GE3 are equal and opposite to the spectral dispersion of the diffractive optics 7 in GE1. On account of the order-separating element 16, all of the orders of diffraction of the phase grating 7 are then imaged by the collecting optics L2 onto separate lateral positions of the PHE, after they have been spectrally corrected by the second diffractive optics 13. Correspondingly, a confocal diaphragm 15 with a matrix arrangement of $(2m+1)^2$ apertures is arranged in the confocal plane. Finally, the lens L3 images the PHE onto the detector matrix 9, which is arranged in a further image plane wBE. In the variant of FIG. 3A, the imaging takes place without spectral dispersion on the detectors 9.

In FIG. 3B, a spectrally dispersing element 12, which is passed through by all the orders of diffraction, has been introduced in the pupil plane (PE) upstream of the sensor matrix 9. Accordingly, the orientation of the spectral light distribution on the sensor matrix is the same for all of the orders of diffraction of the phase grating. However, the spectral resolution may vary on account of the different angles of incidence. Ideally, the element 12 is reversibly positionable, so that it is possible to switch over between the arrangements in FIGS. 3A and 3B. This may in turn be used for the calibration of the spectral resolution.

In alternative embodiments, the confocal diaphragm does not have $(2m+1)^2$ apertures, but for example only $(2m+1)$ apertures.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Microscope
2 Objective
3 Transfer optics
4 Deflecting unit
5 Transfer optics
6 Beam splitter
7 Diffractive optics
8 Collecting optics
9 Detector matrix
10 Phase modulation mask
11 Light source (illumination system)
12 Spectrally dispersing element
13 Diffractive optics
14 Control unit
15 Confocal diaphragm
16 Order-separating element
A Illumination beam path
B Observation beam path
P Sample
PHE Pinhole plane
ZBE Intermediate image plane
L1/2/3 Planes
GE1/2/3 Planes
BE Image plane
PE Pupil plane
wBE Further image plane

What is claimed is:

1. A confocal scanning fluorescence microscope comprising an optical system-having a microscopic observation beam path from a measurement volume to an image plane, a microscope objective having an optical axis, a beam combiner with an input for coupling an illumination system and a diaphragm arranged in the image plane, said optical system including a first diffractive optics for splitting light beams into beam bundles along different orders of diffraction in the observation beam path between the beam combiner and the image plane, said first diffractive optics configured to impart to the light beams of each order of diffraction a spherical phase that is different from the other orders of diffraction, in particular a respective integral multiple of a spherical phase, a second diffractive optics for the compensation of chromatic aberrations of the split beam bundles, a collecting optics for the focusing of the split beam bundles into the image plane, optics for extending along said optical axis of the objective a depth of focus of the microscope objective for the illumination system, said optics for extending the depth of focus being arranged outside the observation beam path between the illumination system and the beam combiner input for the coupling of the illumination system, and wherein the diffractive optics are formed such that midpoints of adjacent axial measurement volumes for a predetermined excitation wavelength, a predetermined numerical aperture of the microscope objective, a predetermined confocal diaphragm aperture size and a predetermined refractive index of an immersion medium are more than two optical section thicknesses of the microscope from one another.

2. The microscope as claimed in claim 1, wherein said diffractive optics being a two-dimensional phase grating, which splits wavefronts coming from the microscope objective into $(2m+1)^2$ orders of diffraction with m=1,2,3,... over two different spatial directions.

3. The microscope as claimed in claim 1, wherein said diaphragm has an aperture and the collecting optics focusing each of the split beam bundles of the various orders of diffraction onto said aperture.

4. The microscope as claimed in claim 1, wherein said diaphragm has for each of the split orders of diffraction, or at least for a subset of the split orders of diffraction, a respective aperture and the collecting optics focusing each of the split beam bundles of the various orders of diffraction onto the relevant aperture.

5. The microscope as claimed in claim 1, wherein said optical system further comprises at least one optics for producing a further image plane, with an arrangement of detectors in the further image plane.

6. The microscope as claimed in claim 1, wherein at least one spectrally dispersive element is arranged between the image plane and the further image plane in such a way that, for each of the split beam bundles at least of the orders of diffraction other than zero, different wavelengths are focused onto different locations of the further image plane, in particular with arrangement of the at least one dispersive element in a collimated beam path portion of the optics for producing the further image plane.

7. The microscope as claimed in claim 6, wherein the spectrally dispersive element is arranged in or at least approximately in a plane conjugate to the pupil plane of the microscope objective.

8. The microscope as claimed in claim 6, wherein the spectrally dispersive element is movably mounted for reversible removal from the observation beam path.

9. The microscope as claimed in claim 1, wherein the optics for producing an extended depth of focus comprises a cubic phase modulation mask or means for producing Bessel beams, in particular in a plane conjugate to the pupil plane of the microscope objective, and/or being designed for underfilling the pupil of the microscope objective, in particular by beam shaping, in particular to reduce a beam cross section of collimated light.

10. The microscope as claimed in claim 1, wherein the optics for producing an extended depth of focus produces an illumination volume of which the axial extent is at least five times its lateral extent.

11. The microscope as claimed in claim 1, wherein the first diffractive optics are arranged in or at least approximately in a plane conjugate to a pupil of the microscope objective.

12. The microscope as claimed in claim 1, wherein the optical system having an adjustable beam deflecting unit for sequentially scanning different measurement volumes and a transfer optics for imaging the deflecting unit into a pupil of the microscope objective located between the microscope objective and the beam combiner.

13. The microscope as claimed in claim 5, wherein the detectors are arranged for the spatial oversampling of the point spread function in at least one of the orders of diffraction, preferably in each order of diffraction.

14. The microscope as claimed in claim 1, wherein the optics for extending the depth of focus are formed such that all of the measurement volumes imaged into the image plane lie within the extended depth of focus.

15. The microscope as claimed in claim 1, wherein illumination light extends in a longitudinal direction parallel to the optical axis of the microscope objective.

16. The microscope as claimed in claim 1, wherein the optics for producing an extended depth of focus has a thickness producing an illumination volume of which the axial extent is at least ten times, its lateral extent and/or, for a predetermined excitation wavelength, a predetermined numerical aperture of the microscope objective, a predetermined confocal diaphragm aperture size and a predetermined refractive index of an immersion medium, corresponds to at least two optical section thicknesses of the microscope.

17. The microscope as claimed in claim 1, wherein the optics for producing an extended depth of focus has a thickness producing an illumination volume of which the axial extent is at least twenty times, its lateral extent and/or, for a predetermined excitation wavelength, a predetermined numerical aperture of the microscope objective, a predetermined confocal diaphragm aperture size and a predetermined refractive index of an immersion medium, corresponds to at least two optical section thicknesses of the microscope.

18. The microscope as claimed in claim 1, wherein the optics for producing an extended depth of focus produces an illumination volume whose extent, for a predetermined excitation wavelength, a predetermined numerical aperture of the microscope objective, a predetermined confocal diaphragm aperture size and a predetermined refractive index of an immersion medium, corresponds to at least two optical section thicknesses of the microscope.

* * * * *

UNITED STATES PATENT AND TRADEMARK OFFICE
CERTIFICATE OF CORRECTION

PATENT NO. : 10,802,256 B2
APPLICATION NO. : 15/117849
DATED : October 13, 2020
INVENTOR(S) : Tiemo Anhut, Daniel Schwedt and Matthias Wald It is certified that error appears in the above-identified patent and that said Letters Patent is hereby corrected as shown below:

On the Title Page

Inventors, Line 7-8    now reads: "Daniel Schwedt, Weimar (DE)"
should read -- Daniel Schwedt, Jena (DE) --

In the Specification

Column 10, Line 50    now reads: "of the zeroth order. In this case, the detectors $9_{1k}$ measure"
should read -- of the zeroth order. In this case, the detectors $9_{ik}$ measure --

Signed and Sealed this
Nineteenth Day of January, 2021

Andrei Iancu
*Director of the United States Patent and Trademark Office*